United States Patent [19]

Levino

[11] Patent Number: 4,912,831
[45] Date of Patent: Apr. 3, 1990

[54] METHOD FOR ASSEMBLING BOLTED STATOR COILS

[75] Inventor: Andre J. Levino, Irwin, Pa.

[73] Assignee: Westinghouse Electric Corp., Pittsburgh, Pa.

[21] Appl. No.: 366,337

[22] Filed: Jun. 13, 1989

Related U.S. Application Data

[60] Continuation of Ser. No. 280,868, Dec. 7, 1988, abandoned, which is a division of Ser. No. 2,063, Jan. 9, 1987, Pat. No. 4,806,807.

[51] Int. Cl.$^4$ .............................................. H02K 15/06
[52] U.S. Cl. ...................................... 29/596; 29/407; 310/42
[58] Field of Search ................... 29/596, 407; 310/42, 310/260, 270, 52, 54, 57, 58

[56] References Cited

U.S. PATENT DOCUMENTS 4,385,254  5/1983  Vakser et al. ...................... 310/260
4,618,795  10/1986  Cooper et al. ..................... 310/260

*Primary Examiner*—Carl E. Hall
*Attorney, Agent, or Firm*—M. G. Panian

[57] ABSTRACT

In an electrical generator, a connector for connecting stator coil sections and the method of making that connection, each coil section ending in a header cap of a predetermined geometry, and the connector being provided with openings of complementary geometry and spaced and aligned so as to receive the header caps. A recording tool is used for recording the spacing and alignment of a pair of header caps to be connected, the recorder being used in conjunction with a drill rig for drilling the openings in accordance with the recorded spacing and alignment information. The solid connector bar is placed over the header caps which are received within the drilled openings, and the bar is clamped onto the header caps with nuts.

9 Claims, 7 Drawing Sheets

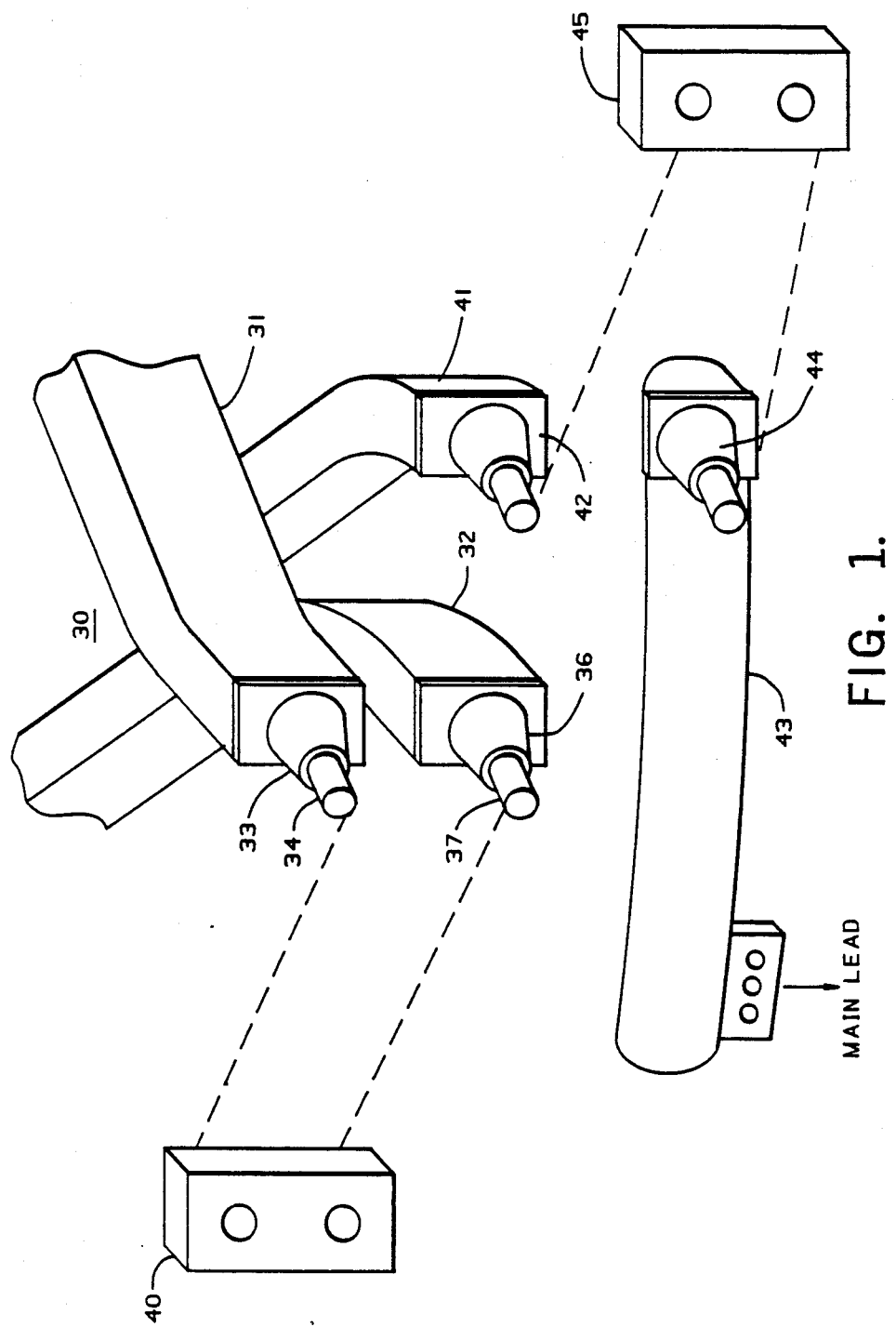

METHOD FOR ASSEMBLING BOLTED STATOR COILS

This application is a continuation of application Ser. No. 07/280,868 filed Dec. 7, 1988, now abandoned, which is a division of Ser. No. 07/002,063 filed Jan. 9, 1987, now U.S. Pat. No. 4,806,807.

BACKGROUND OF THE INVENTION

1. Field of the Invention

This invention relates to series and phase connectors for power station generators, and in particular to a method of making such connections and apparatus for performing such method.

2. Description of the Prior Art

The environment of the instant invention is that of large electrical generators, e.g., generators driven by turbines in a nuclear or other commercial power generating plant. The size and geometry of such generators requires that in constructing or repairing the stator coils, the coils must be placed in sections, or halves, and after they are in place those sections must be connected at their ends. Similarly, connections are required between the end of each phase coil and the parallel phase ring which circles around the end of the generator stator.

The standard prior procedure of assignee in the generator construction and repair art is that of individually fitting a connector by constructing a bundle of separate conductors. The problem presented is that the tolerance of construction of the coil sections is such that the positions of the coil ends to be connected vary within a tolerance of +/− one half inch, so that there is a range of about one inch in the variation of the coil ends which are to be joined. Further, the coil section ends, or headers, project axially from the end of the stator at an angle which may vary within some practical range. In the standard prior technique it has been necessary to wait until all the coil sections were in place in the stator, and then roll the stator to make the individual connections. Each connection has required the individual placing and bending into shape of a large number, e.g. 65, conductor sections which are squeezed together to make the connector portion. In this technique each conductor has to be hand bent to line it up properly, and then the connector must be soldered and brazed to the respective pair of header caps.

The above-described procedure has been necessarily a series operation, in the sense that little other work on the stator construction can progress while this operation is taking place. Up until this time, a job on a large generator in the field has taken typically one-two weeks for making the coil connections, involving a significant amount of time and cost. The problem is exacerbated in the repair of generators in nuclear power plants where a generator may be out of operation for only a limited amount of time while the fuel is being replenished. If the coil end connecting takes 1–2 weeks, the overall repair may not be completed by time the nuclear reactor is ready for operation, thus causing very expensive downtime of the entire plant. Thus, the need that has been presented is one of not only reducing the cost of the actual connection operation, but reducing the "cycle" time of recoiling the stator conductors, as well as time spent in building new units.

The approach of this invention has been to provide a novel technique for determining the geometry of the connector required for each series and/or phase connection as soon as the coil sections are in place. Thus, while coil construction and replacement is ongoing, information concerning the geometry of each required connection is used to separately machine the connectors for each required connection, which connectors can then be quickly clamped into position. Thus, the work of preparing the connectors can be carried on in parallel while the coil sections themselves are being placed, significantly reducing the overall time required for the operation.

SUMMARY OF THE INVENTION

It is an object of this invention to provide an improved method of making connections between series and phase coil sections of an electrical power generator, and to provide apparatus for carrying out such improved method.

It is a further object of this invention to provide a method of connecting coil sections of an electrical generator which enables simple clamping of connector bars onto the header cap ends of coil sections, eliminating the need for hand construction of connectors and for soldering the connectors to the coil header caps.

It is a further object of this invention to provide means for determining and recording the spacing and geometry of adjacent coil section ends, and for using such determined spacing and geometry information in a parallel operation of machining connectors.

It is another object of this invention to provide simple and efficient equipment for machining connector elements in accordance with predetermined data concerning the geometrical relationship of the coil ends to be connected. It is yet another object of this invention to provide an electric power generator having improved connections of stator coil sections.

In accordance with the above objects, there is provided an improved electrical generator and method of making same, the electrical generator having connectors which connect coil ends which have a spacing and relative geometry which is subject to construction tolerances. The invention specifically comprises a method of making such connectors and clamping them onto generators. Each coil section joined is provided with a header cap of predetermined geometry, and a solid connector bar is machined having openings of complementary geometry for tightly receiving the header caps. The connector bar is mechanically clamped to the header caps so that they are tightly received in the openings, thereby providing a tight mechanical and electrical connection. The method of making the connector bar comprises, in the preferred embodiment, the use of a simulating tool which is positioned on the pair of header caps to record the spacing and alignment of the caps, and which is then used for providing information directing the drilling of the connector openings.

The method preferably includes the use of a drilling jig designed to be adjusted to hold the bar for drilling the connector openings in accordance with the recorded information.

BRIEF DESCRIPTION OF THE DRAWINGS

FIG. 1 is a perspective view of a generator stator showing the ends of a pair of coil sections and a connector in accordance with this invention for connecting such ends; the view also shows a phase coil end and a parallel phase ring, and a connector for connecting the phase coil and the parallel ring.

DESCRIPTION OF THE PREFERRED EMBODIMENTS

Figure 2A:
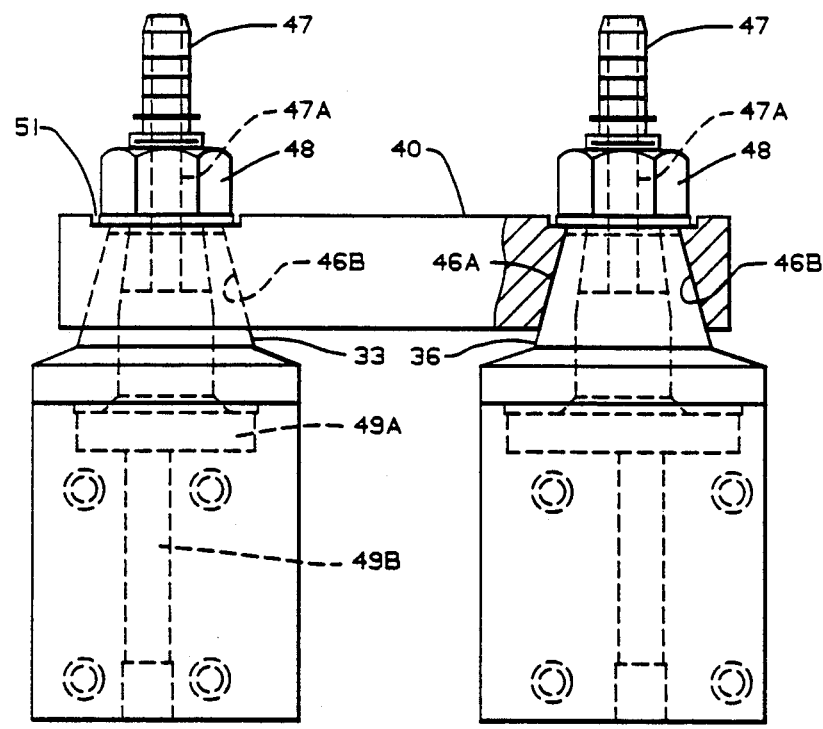
FIG. 2A is a side view of a pair of coil section ends and the connector of this invention in place.

As used in the following description, connection of coil ends refers to the connection of ends of coil halves or sections, as well as the connection of coil ends to phase rings. Further, as used in the specification and claims which follow, the phrase "coil ends" embraces both coil ends and the headers of the generator phase parallel ring. The term "connector" as such embraces the header caps and the solid copper bar with matching holes which receive the header caps.

Referring now to FIG. 1, there is shown a diagrammatic view of the ends of a pair of coil sections of a generator stator, and the manner of connecting those ends in accordance with this invention. There is similarly shown an end of a phase coil and its connection to the parallel phase ring in accordance with this invention. These coils are, as is well known in the art, portions of a generator stator 30 of a large generator used, for example, in a nuclear power generating plant. The top coil section 31, which is a first half of a coil loop, is shown as terminating in a top header cap 33, which in this invention is a copper piece which is brazed to the coil element. A water hose nipple 34 is illustrated extending from the header cap, which water hose nipple is brazed onto the header cap, and receives a water hose for communicating water into the interior of the coil for cooling purposes. Likewise the bottom coil section 32 terminates in a bottom header cap 36 and bottom water hose nipple 37. The connector bar 40 is formed with a pair of holes which are machined in accordance with the method of this invention for snuggly receiving header caps 33 and 36, thereby providing a secure mechanical and electrical connection between the top and bottom sections of the coil loop. Likewise, the bottom phase coil header is shown having header cap 42, while the parallel phase ring is illustrated having header cap 44. Connector bar 45 is positioned to provide an integral mechanical and electrical contact between the bottom phase coil and the parallel ring. Thus, as discussed in the background section of this specification, when the coil sections are in place, the connector bars are machined so that the receiving holes are properly spaced and angularly aligned to make excellent connections. The connections are made by simply placing the machined connector bar onto the header caps and affixing it with nuts which screw onto the threaded nipples, as is discussed in greater detail hereinbelow.

Referring now to FIG. 2A, there is shown a copper connector bar 40, machined in accordance with the methods of this invention, attached to the header caps 33, 36. While FIG. 2A and the subsequent discussion illustrate a series connection of coil sections, the discussion is equally applicable to a connection between a phase header cap and the header cap on a parallel phase ring.

Figure 2B:
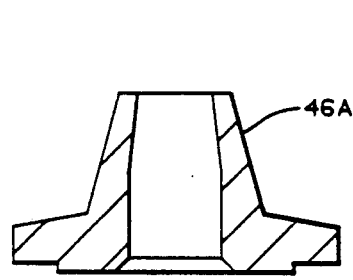
FIG. 2B is a detailed drawing of a header cap as used in this invention.
Figure 2C:
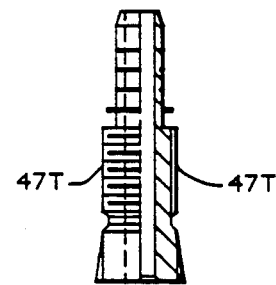
FIG. 2C is a detailed view of a water hose nipple as used with a header cap in this invention.

The header caps 33, 36, details of which are shown in FIG. 2B, each have an upper conical surface 46A, and seat into complementary conical holes 46B drilled into bar 40. A water hose nipple 47, shown in detail in FIG. 2C, is brazed integrally with the header cap such that it projects through the interior of the header cap, the nipple end projecting up and out as seen in FIG. 2A. A central axial cylindrical passage 47A passes through the nipple, to provide a water passage. Threads 47T are shown on the nipple (FIG. 2C) for receiving the securing nut 48 which is used to clamp the bar 40 down tightly so that the header caps are seated into the conical openings 46B. As illustrated, the header cap terminates at the bottom into a water chamber 49A formed in the top of the coil header, which chamber communicates through a water passage 49B to the interior passage of the coil.

Figure 3A:
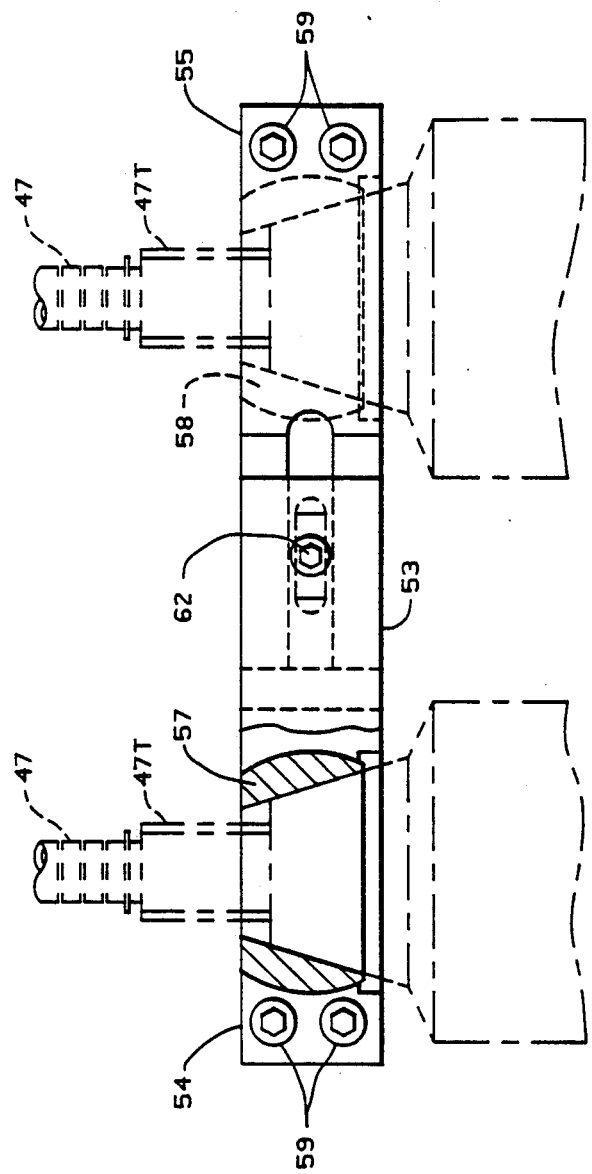
FIG. 3A is a side view of a preferred embodiment of the simulating tool of this invention illustrated in position on a pair of header caps.
Figure 3B:
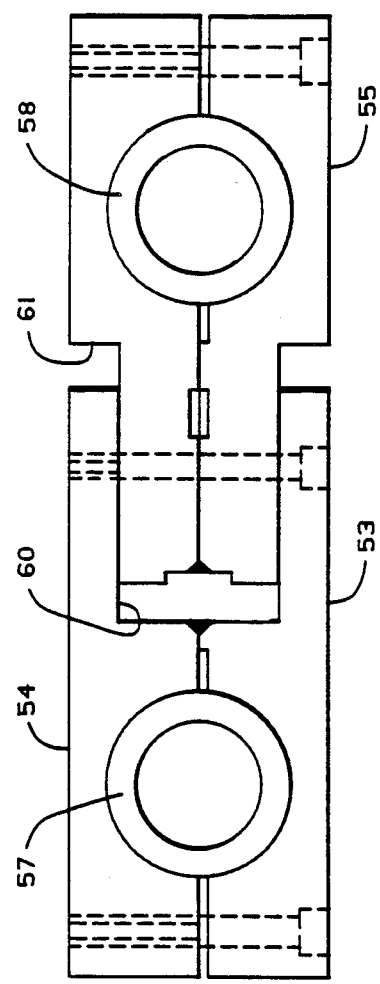
FIG. 3B is a plan view of the simulating tool illustrated in FIG. 3A.

Referring now to FIGS. 3A and 3B, there is illustrated the simulating tool which is used in the method of this invention for preparing the connector bar with which the coil ends are connected. Simulating tool 53 comprises, as illustrated in the drawings, a left tool housing 54 and a right tool housing 55, which housings are slidable longitudinally with respect to each other, to adjust the overall length of the tool. Left tool housing 54 comprises left swivel ball socket 57, while right tool housing 55 comprises right swivel ball socket 58. The ball sockets each provide an interior conical surface of geometry complementary to that of the header cap, which surface is adjustable angularly, i.e. with respect to the center axis through the simulating tool.

As illustrated in FIG. 3A, the two ball sockets are mounted on the conical projecting portions of header caps 33 and 36. Depending upon the angular projections of each of said header caps, the sockets are adjusted accordingly to accommodate the respective projections. Further, the left and right tool housings, 54 and 55 respectively, are adjusted by sliding them relative to each other. Left tool housing 54 has a left mating surface 60 having projecting ridges, while right housing section 55 has a right mating surface having receiving grooves, thus restraining the movement of the two members to a strictly sidewise movement. By adjusting these members relative to each other, the proper spacing of the ball sockets is achieved, so as to accommodate the spacing between header caps 33 and 36. A thumb nut, not shown, can be used to screw onto the threads 47T of each water nose nipple, for pressing the socket into proper position. When each socket is properly placed, the ball sockets are secured by tightening lock bolts 59, while the spacing of the left and right members is secured by tightening lock bolt 62. Simulating tool 53, in operation, is then removed from the actual header caps on the stator, and thus serves as a recording means for recording the spacing and angular projections of the pair of header caps. Note that whatever the relative axes of the two coil headers, the ball sockets record their relative alignment; likewise, the spacing of the two header caps is also recorded.

Figure 4A:
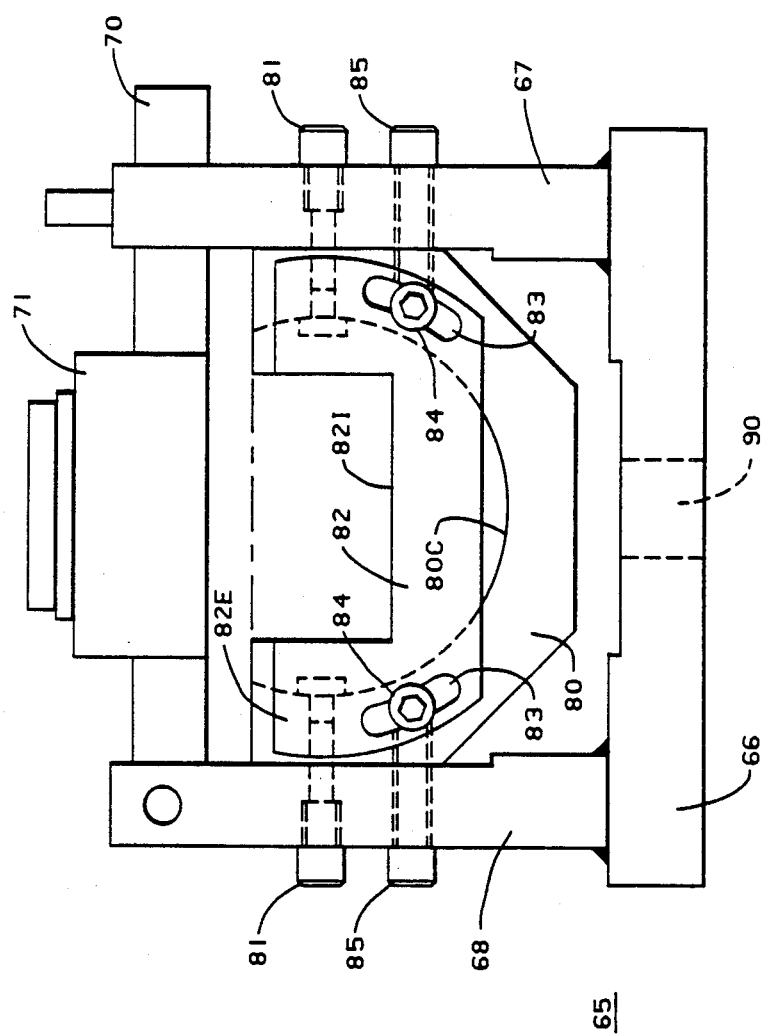
FIG. 4A is an end view of a preferred embodiment of the drilling jig of the apparatus and method of this invention.
Figure 4B:
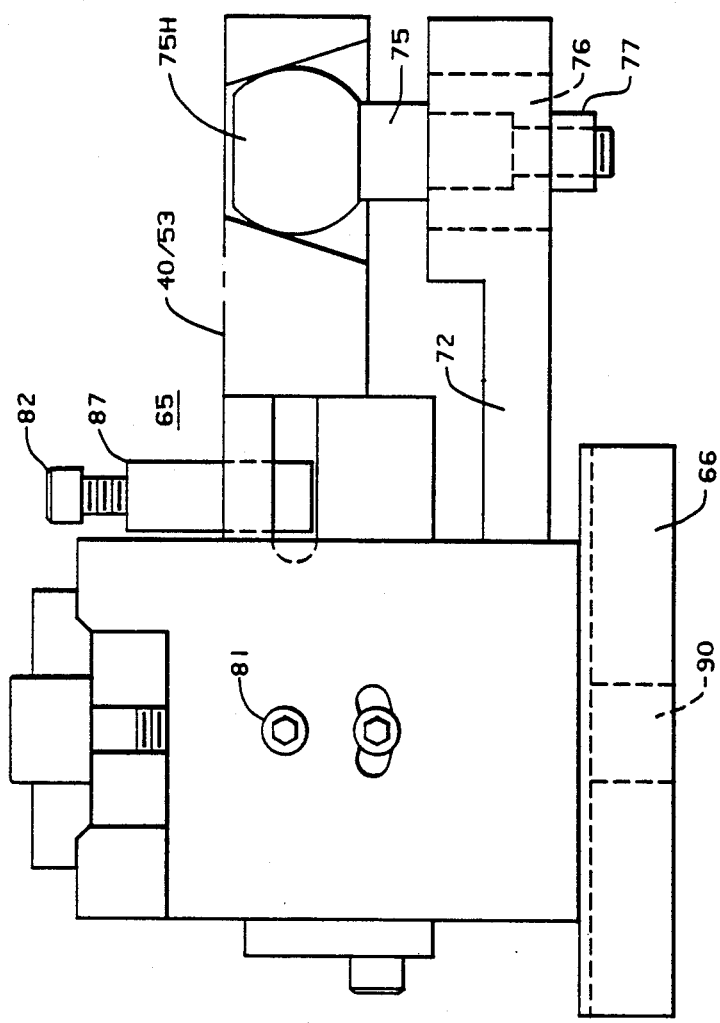
FIG. 4B is a side view of the drilling jig of FIG. 4A.
Figure 4C:
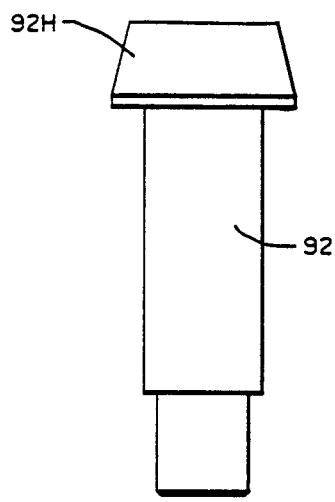
FIG. 4C is a detailed illustration of the simulating tool alignment pin used in practicing the preferred embodiment of the method of this invention.

Referring now to FIGS. 4A and 4B, there is illustrated a drilling jig 65 which may be used, in conjunction with the simulating tool 53, for drilling of the receiving holes 46B in the connector bar 40. The jig 65 comprises a base 66, a front jig vertical support member 67 and back jig vertical support member 68. A cover 70, comprising a centrally located drill bushing 71 is utilized for the specific drilling operations.

The jig is used in combination with the simulating tool in the following manner. First, the simulating tool is laid in the jig, in a manner described in more detail hereinbelow, and the jig is adjusted for drilling straight through the opening presented by the left hand first ball socket of the simulating tool. The tool is then removed and the connector bar is placed in the jig for drilling of the first conical opening. The bar is then removed and the simulating tool is again placed in the jig, which is adjusted for drilling of the second opening. The simulating tool is positioned lengthwise, as seen in side view 4B, with the first opening accommodated by a spacing location guide. When the simulating tool is adjusted within the jig so that the drill registers with the second opening, the tool is then removed and the bar is put back in the jig for drilling of the second hole. In this manner the recorded spacing and angle information of the simulator tool is used in conjunction with the jig for drilling the mating openings 46B in the bar. This procedure is explained in greater detail in connection with the following discussion of the structure of the drilling jig.

The jig housing supports a lower adjustable member 80 which tilts along its length, about lock pins 81. Thus, adjustable member 80 is able to rotate about an axis perpendicular to the drill axis with a first degree of freedom, to adjust the angle thereof with respect to the horizontal. Member 80 has an inner circular surface 80C, in which is received upper adjustable member 82 having a longitudinal barrel with a diameter to fit rotatably within surface 80C. Member 82 in turn has an inner surface 82I which is adapted to snugly receive either the simulating tool or the bar 40. Surface 82I has a hole in it (not shown) which permits placement of alignment pins 92 and 94 therethrough, as discussed below. Member 82 has an end portion 82E which extends to the left of lower member 80 as seen from the side view of FIG. 4B, and has slots 83 permitting rotation of member 82 angularly with regard to pins 84. Thus, member 82 provides a second degree of freedom, permitting positioning of surface 82I angularly with respect to the axis that goes into the view of FIG. 4A, and which is horizontal in FIG. 4B. Lock nuts 85 secure the angular position when it has been properly adjusted.

In practice, the user takes the simulating tool 53 and places one end of it substantially beneath the projection of the drill which descends vertically as seen in the drawings. A simulating tool aligning pin 92, having a header portion 92H which simulates the geometry of the header cap, is placed in the jig, the bottom portion being positioned in opening 90 in base 60. Opening 90 is positioned directly beneath the path of the drill, and portion 92H projects up through the hole in surface 82I. When adjusting elements 80 and 82 are properly adjusted, the left opening of the simulating tool 53 fits snugly over head 92H, indicating proper adjustment. The simulating tool can now be removed and the bar placed into the jig, seated firmly on surface 82I and in proper angular position for drilling of the first opening.

The procedure of this invention comprises first drilling a through hole of constant diameter, and also drilling a spot face 51 (FIG. 2A). If desired, a stop pin (not illustrated) may be seated in opening 90 for controlling the downward penetration of the drill, thus controlling the depth of the spot face drilling.

Figure 4D:
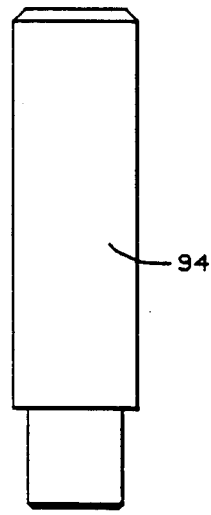
FIG. 4D is a detailed view of the through hole alignment pin used in practicing the preferred embodiment of this invention.

Following the drilling of the through hole and the spot face, the bar is removed and turned over for drilling of the conical opening, i.e. conical opening is drilled approaching the bar from the opposite side. As is understood, in order to do this, the position of the bar in the drilling jig must be properly adjusted, so that the angle of the bar is effectively reversed. This step is aided by utilizing a through hole alignment pin 94 (FIG. 4D), which is seated likewise within opening 90 and has an outer diameter equal to that of the through hole diameter. With this as a guide, the adjustable members 80, 82 are easily adjusted so that the drill is aimed straight through the center of the through hole. Upon securing members 80, 82 of the jig for this position, the through hole alignment pin 94 is removed and the bar is placed back in proper position, whereupon the conical opening is drilled.

Following drilling of the first conical opening, it is necessary to prepare the jig for drilling of the second opening. The additional step that must be taken at this point is that of properly locating the spacing between the first opening which has already been drilled and the second opening which is yet to be drilled. This is done by replacing the simulating tool 53 into the jig, and affixing the drilled opening with respect to the spacing location guide 75. As seen in FIG. 4B, location guide 75 is seated in opening 76 of bottom horizontal support member 72, and has an upper circular head portion 75H over which the already drilled conical opening is seated. At the same time, simulating tool alignment pin 92 is replaced in the opening 90. Then the spacing location guide is adjusted horizontally with respect to alignment pin 92 to that both openings of the simulating tool properly seat down onto location guides 75 and tool alignment pin 92 respectively. The spacing location guide, which is movable horizontally within opening 76, is then clamped into position with nut 77. The jig is properly aligned through adjustment of members 80 and 82, as with the prior hole. The simulating tool 53 is then removed and the bar is replaced, the already drilled hole being positioned over the upper ball portion of location guide 75. Drilling is then carried out in the same sequence as described above.

While an embodiment of a rather simple drilling jig has been illustrated for use with the invention, it is to be understood that more sophisticated drilling equipment can be utilized within the scope of this invention.

There is thus disclosed a method, and perferred apparatus for carrying out such method, of making a simple but reliable clamped connection of header caps, thus joining a pair of series coil sections or a phase line to the parallel phase ring. The method avoids the time consuming process of fitting and adjusting a large plurality of conductor pieces, and avoids the prior soldering requirements. While the preferred embodiment as described incorporates the use of conical shaped header caps and complementary conical holes in the connector bar, other geometric forms can be utilized equally and within the scope of the invention.

As seen in the above discussion of the preferred embodiment, the method comprises means for simulating the spacing and alignment of the connector bar openings which are then machined to receive the pair of header caps, the simulating means providing an accurate record or recording of that information. The simulating tool can record the spacing of the header caps, which will be variable within a certain range, or tolerance, eg. up to about an inch or more; and can record the projection, i.e. or axial alignment, of each header cap. As used herein, the term alignment means the angular position, or projection of the header cap, which also will vary within a normal range, or tolerance. Although a preferred mechanical form of recording means has been illustrated, other recording or simulating means, mechanical or electrical, may be used within the scope of this invention. The method of the invention can be practiced in construction of new generators as well as in repairing generators.

I claim:

1. A method of building stator coils of an electrical generator, the coils having connected coil section ends, comprising
    placing coil sections in the stator,
    measuring the spacing and alignments of a pair of coil section ends which are to be connected,
    separately machining a connector element with openings having said measured spacing and alignments, said machining being carried out while other coil sections are being placed, and
    clamping said connector element to said coil section ends, said ends being received in said openings.

2. A method for connecting coil sections of a stator in an electric generator, the connection being made to the headers on the ends of a pair of coil sections, the connected ends having a given spacing within a given tolerance and respective alignments within a given tolerance, comprising
    recording said spacing and alignments in a recording means, drilling receiving openings in a connector element for receiving said two coil ends, said drilling step including spacing said openings in accordance with said recorded spacing and aligning said openings in accordance with said recorded alignments, so as to drill said openings to mate with said two coil ends, and receiving said coil ends in said drilled connector openings and clamping said connector element to said ends, to achieve mechanical and electrical connection.

3. The method as described in claim 2, wherein said recording step is carried out by using a mechanical simulating tool.

4. The method as is described in claim 2, wherein said drilling step is carried out by using a drilling rig, and comprises transforming the recorded spacing and alignment from said simulating tool to said drilling rig.

5. The method as described in claim 2, wherein said clamping steps comprises mechanically clamping by tightening nuts onto said coil ends after said connector has been placed over said headers.

6. The method as described in claim 2, comprising forming each of said headers of a predetermined geometry, and wherein said drilling step comprises drilling said openings to mate with said headers.

7. The method as described in claim 6, wherein said geometry is conical.

8. A method of connecting a pair of stator coil ends of an electric generator, comprising
    using a simulating tool to record the respective alignments of the pair of coil ends and the spacing therebetween;
    placing said simulating tool in a drilling rig and adjusting said rig for drilling a first opening;
    removing said simulating tool and drilling said first opening at an alignment corresponding to the recorded alignment of a first of said coil ends;
    removing said connector bar and placing said simulating tool in said drilling rig and positioning said rig for drilling of a second opening at an alignment corresponding to the recorded alignment of the second coil end and at a spacing equal to the recorded spacing;
    removing said simulating tool from said rig and replacing said connector bar into said rig, adjusting the position of said rig for drilling said second hole at said spacing, and drilling said second hole in a position spaced from said first hole by said spacing and at an alignment corresponding to said second coil end alignment;
    removing said bar from said drilling rig and placing it over said pair of coil ends so that said ends are received in said openings; and
    clamping said bar to said coil ends, to provide a firm electrical and mechanical connection.

9. The method as described in claim 8, comprising positioning a spacing location guide in said drilling rig for fixing the position of the first recorded hole of said simulating tool relative to the axis of the drill, thereby recording in said rig the spacing of said simulating tool.

* * * * *